United States Patent
Johnson et al.

(10) Patent No.: US 6,499,180 B1
(45) Date of Patent: Dec. 31, 2002

(54) DEVICE FOR HEATING A WIPER BLADE

(76) Inventors: George Johnson, 5550 Ivanhoe, Detroit, MI (US) 48204; Arlene Johnson, 5550 Ivanhoe, Detroit, MI (US) 48204

( * ) Notice: Subject to any disclaimer, the term of this patent is extended or adjusted under 35 U.S.C. 154(b) by 0 days.

(21) Appl. No.: 09/849,418

(22) Filed: May 4, 2001

(51) Int. Cl.[7] .............. B60S 1/38; B60S 1/04
(52) U.S. Cl. .................. 15/250.07; 219/202
(58) Field of Search ............... 15/250.07, 250.05, 15/250.06, 250.08, 250.09; 219/202, 203

(56) References Cited

U.S. PATENT DOCUMENTS

| | | | |
|---|---|---|---|
| 2,034,880 A | * 3/1936 | Sackett | 15/250.07 |
| 3,619,556 A | 11/1971 | Deible | |
| 4,152,808 A | 5/1979 | Andregg | |
| 4,194,261 A | * 3/1980 | Parkinson | 15/250.07 |
| 4,603,451 A | * 8/1986 | VanSickle | 15/250.07 |
| 4,967,437 A | 11/1990 | Morse | |
| D375,289 S | 11/1996 | Waselewski et al. | |
| 5,603,856 A | 2/1997 | Bischoff | |
| 5,749,118 A | 5/1998 | Holland | |

FOREIGN PATENT DOCUMENTS

| | | | | |
|---|---|---|---|---|
| FR | 2585649 | * | 2/1987 | ............... 15/250.05 |

\* cited by examiner

*Primary Examiner*—Gary K. Graham

(57) ABSTRACT

A device for heating a wiper blade for preventing ice build-up on windshield wiper blades. The device for heating a wiper blade includes an elongated block having a first end and a second end. The block has a top side, a bottom side, a first lateral side and second lateral side. The bottom side has a channel therein extending toward the top side and extending through the first and second ends. A plurality of heating elements is positioned in the block. An actuator turns the heating elements on or off and is operationally coupled to the heating elements. The actuator is operationally coupled to a power supply. A wiper blade is positionable in the channel. The top side of the block is attached to a wiper blade arm.

6 Claims, 3 Drawing Sheets

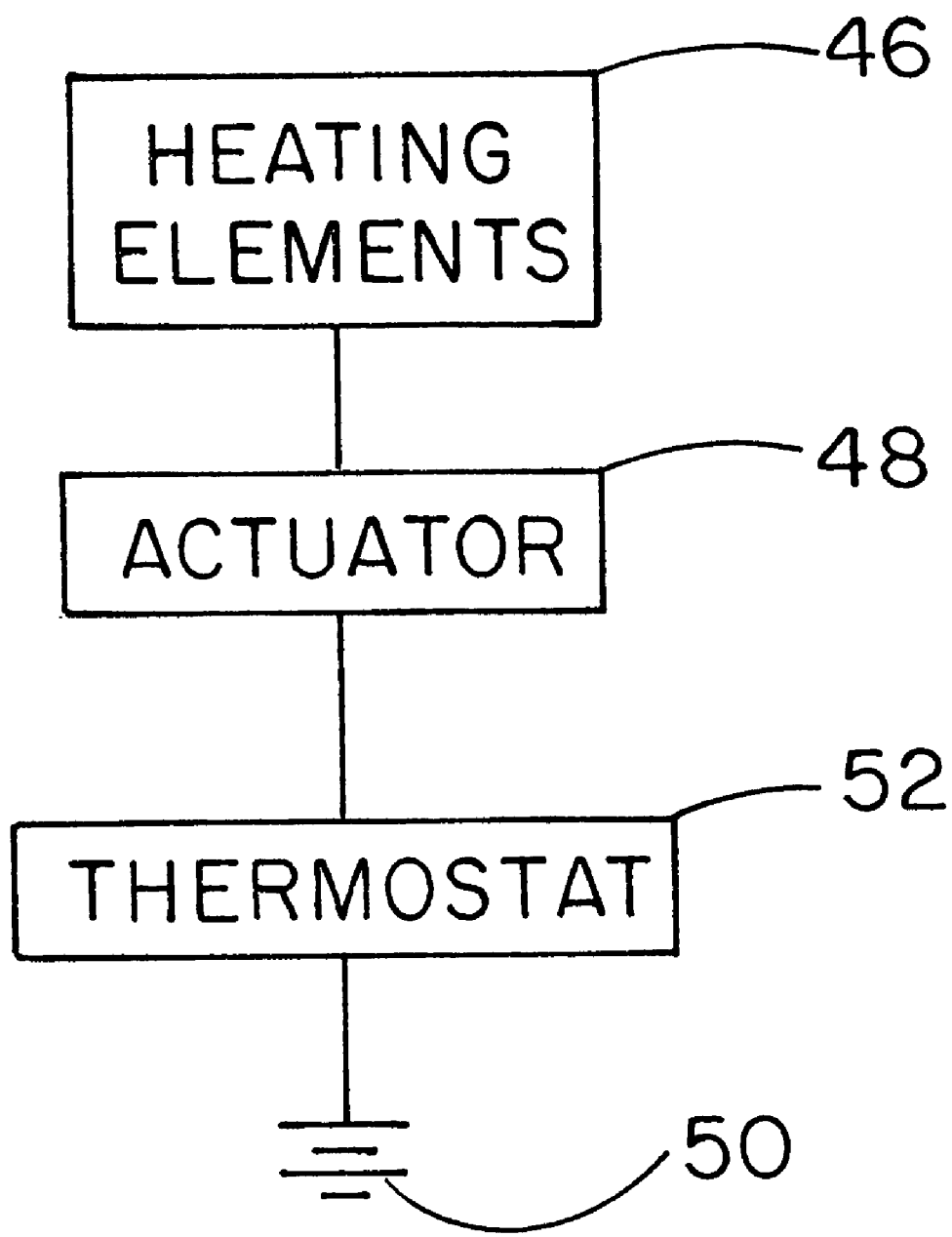

DEVICE FOR HEATING A WIPER BLADE

BACKGROUND OF THE INVENTION

1. Field of the Invention

The present invention relates to wiper blade heating assemblies and more particularly pertains to a new device for heating a wiper blade for preventing ice build-up on windshield wiper blades.

2. Description of the Prior Art

The use of wiper blade heating assemblies is known in the prior art. More specifically, wiper blade heating assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,603,856; 3,619,556; 4,152,808; 4,967,437; 5,749,118; and U.S. Des. Pat. No. 375,289.

While these devices fulfill their respective, particular objectives and requirements, the aforementioned patents do not disclose a new device for heating a wiper blade. The inventive device includes an elongated block having a first end and a second end. The block has a top side, a bottom side, a first lateral side and second lateral side. The bottom side has a channel therein extending toward the top side and extending through the first and second ends. A plurality of heating elements is positioned in the block. An actuator turns the heating elements on or off and is operationally coupled to the heating elements. The actuator is operationally coupled to a power supply. A wiper blade is positionable in the channel. The top side of the block is attached to a wiper blade arm.

In these respects, the device for heating a wiper blade according to the present invention substantially departs from the conventional concepts and designs of the prior art, and in so doing provides an apparatus primarily developed for the purpose of preventing ice build-up on windshield wiper blades.

SUMMARY OF THE INVENTION

In view of the foregoing disadvantages inherent in the known types of wiper blade heating assemblies now present in the prior art, the present invention provides a new device for heating a wiper blade construction wherein the same can be utilized for preventing ice build-up on windshield wiper blades.

The general purpose of the present invention, which will be described subsequently in greater detail, is to provide a new device for heating a wiper blade apparatus and method which has many of the advantages of the wiper blade heating assemblies mentioned heretofore and many novel features that result in a new device for heating a wiper blade which is not anticipated, rendered obvious, suggested, or even implied by any of the prior art wiper blade heating assemblies, either alone or in any combination thereof.

To attain this, the present invention generally comprises an elongated block having a first end and a second end. The block has a top side, a bottom side, a first lateral side and second lateral side. The bottom side has a channel therein extending toward the top side and extending through the first and second ends. A plurality of heating elements is positioned in the block. An actuator turns the heating elements on or off and is operationally coupled to the heating elements. The actuator is operationally coupled to a power supply. A wiper blade is positionable in the channel. The top side of the block is attached to a wiper blade arm.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new device for heating a wiper blade apparatus and method which has many of the advantages of the wiper blade heating assemblies mentioned heretofore and many novel features that result in a new device for heating a wiper blade which is not anticipated, rendered obvious, suggested, or even implied by any of the prior art wiper blade heating assemblies, either alone or in any combination thereof.

It is another object of the present invention to provide a new device for heating a wiper blade which may be easily and efficiently manufactured and marketed.

It is a further object of the present invention to provide a new device for heating a wiper blade which is of a durable and reliable construction.

An even further object of the present invention is to provide a new device for heating a wiper blade which is susceptible of a low cost of manufacture with regard to both materials and labor, and which accordingly is then susceptible of low prices of sale to the consuming public, thereby making such device for heating a wiper blade economically available to the buying public.

Still yet another object of the present invention is to provide a new device for heating a wiper blade which provides in the apparatuses and methods of the prior art some of the advantages thereof, while simultaneously overcoming some of the disadvantages normally associated therewith.

Still another object of the present invention is to provide a new device for heating a wiper blade for preventing ice build-up on windshield wiper blades.

Yet another object of the present invention is to provide a new device for heating a wiper blade which includes an elongated block having a first end and a second end. The block has a top side, a bottom side, a first lateral side and second lateral side. The bottom side has a channel therein extending toward the top side and extending through the first and second ends. A plurality of heating elements is positioned in the block. An actuator turns the heating elements on or off and is operationally coupled to the heating elements. The actuator is operationally coupled to a power supply. A wiper blade is positionable in the channel. The top side of the block is attached to a wiper blade arm.

Still yet another object of the present invention is to provide a new device for heating a wiper blade that allows changing of wiper blades as they wear out.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an electronic schematic view of the present invention.

DESCRIPTION OF THE PREFERRED EMBODIMENT

Figure 1:
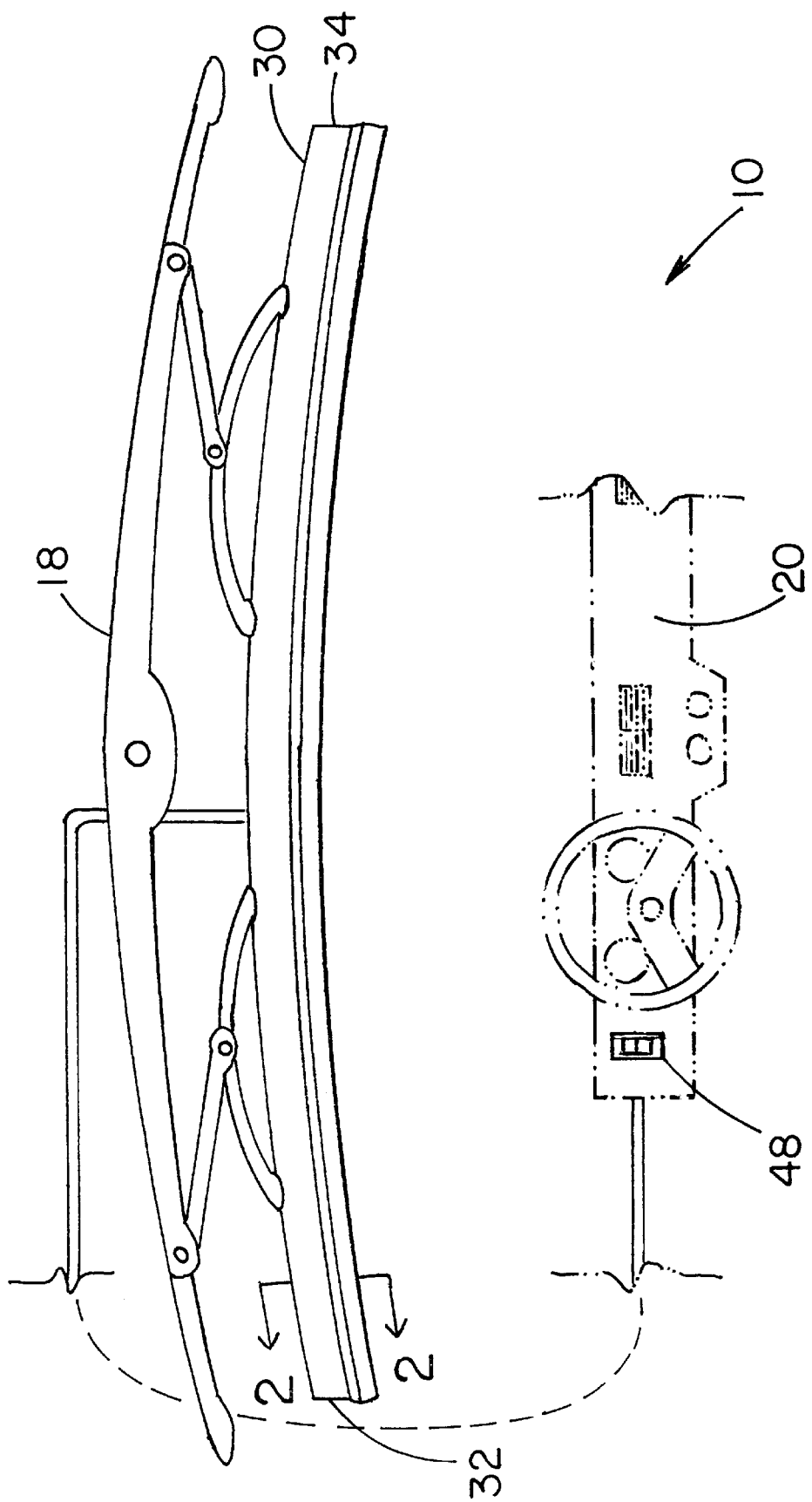
FIG. 1 is a schematic front view of a new device for heating a wiper blade according to the present invention.
Figure 2:
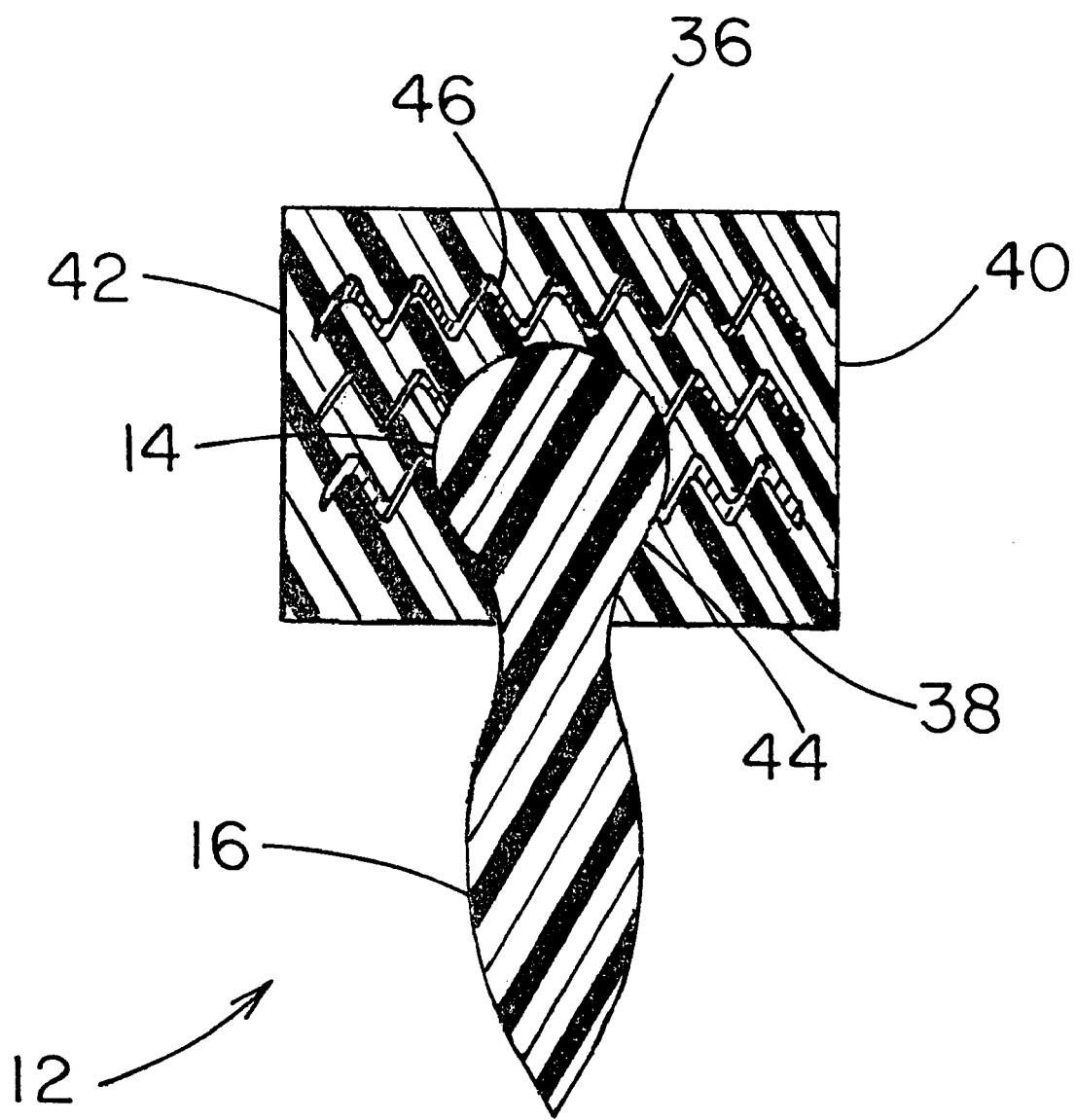
FIG. 2 is a schematic cross-sectional view taken along line 2—2 of FIG. 1 of the present invention.

With reference now to the drawings, and in particular to FIGS. 1 through 3 thereof, a new device for heating a wiper blade embodying the principles and concepts of the present invention and generally designated by the reference numeral 10 will be described.

As best illustrated in FIGS. 1 through 3, the device for heating a wiper blade 10 generally comprises a heated saddle device for removably receiving a wiper blade 12. The blade 12 is elongated and has an upper rounded portion 14 and a pointed lower portion 16 taken transversely to a longitudinal axis of the blade 12. The saddle 10 is attached to a wind shield wiper arm 18 pivotally coupled to a vehicle 20. The device 10 includes an elongated block 30 having a first end 32 and a second end 34. The block 30 has a top side 36, a bottom side 38, a first lateral side 40 and second lateral side 42. The bottom side 38 has a channel 44 therein extending toward the top side 36 and extending through the first 32 and second ends 34. The channel 44 is rounded taken transversely to a longitudinal axis of the block 30. The elongated block 30 preferably comprises a rigid elastomeric material.

A plurality of heating elements 46 is positioned in the block 30. The heating elements 46 extend between the first 40 and second 42 lateral sides and extending along a length of the block 30. The heating elements 46 are conventional heating elements and preferably comprise a copper wire.

An actuator 48 for turning the heating elements 46 on or off is operationally coupled to the heating elements 46. The actuator 48 is positioned in the vehicle 20. The actuator 48 is operationally coupled to a power supply 50, which is preferably the vehicle battery.

A thermostat 52 is operationally coupled to the actuator 48 and in communication with an outer environment of the vehicle 20. The thermostat 52 is adapted for turning the heating elements 46 off when an ambient temperature is greater than a selected temperature. The thermostat 52 prevents the device from overheating by turning the device off if the temperature is beyond a selected temperature outside.

In use, the wiper blade 12 is removably positionable in the channel 44. The block 30 heats the wiper blade 12 to ensure that snow and ice will not build up on the wiper blade. The wiper blade 12 may be removed and replaced as needed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A heated saddle device for removably receiving a wiper blade, the blade being elongated and having an upper rounded portion and a pointed lower portion taken transversely to a longitudinal axis of the blade, the saddle being attached to a wind shield wiper arm pivotally coupled to a vehicle, said device comprising:

an elongated block having a first end and a second end, said block having a top side, a bottom side, a first-lateral side and second lateral side, said bottom side having a channel therein extending toward said top side and extending through said first and second ends;

a plurality of corrugated heating elements being positioned in said block, said heating elements extending between said first and second lateral sides and extending longitudinally along said block, each one of said plurality of heating elements undulating laterally from one lateral side towards the other for increasing surface area, said plurality of heating elements being stacked to maximize heat transfer and minimize deformation of said elongated block during heating;

an actuator for turning said heating elements on or off being operationally coupled to said heating elements, said actuator being operationally coupled to a power supply;

wherein said wiper blade is positionable in said channel.

2. The heated saddle device as in claim 1, wherein said channel is rounded taken transversely to a longitudinal axis of the block.

3. The heated saddle device as in claim 1, wherein said elongated block comprises a rigid elastomeric material.

4. The heated saddle device as in claim 1, further including a thermostat being operationally coupled to said actuator and in communication with an outer environment of said vehicle, said thermostat being adapted for turning said heating elements off when an ambient temperature is greater than a selected temperature.

5. A heated saddle device for removably receiving a wiper blade, the blade being elongated and having an upper rounded portion and a pointed lower portion taken transversely to a longitudinal axis of the blade, the saddle being attached to a wind shield wiper arm pivotally coupled to a vehicle, said device comprising:

- an elongated block having a first end and a second end, said block having a top side, a bottom side, a first lateral side and second lateral side, said bottom side having a channel therein extending toward said top side and extending through said first and second ends, said channel being rounded taken transversely to a longitudinal axis of the block, said elongated block comprising a rigid elastomeric material;
- a plurality of corrugated heating elements being positioned in said block, said heating elements extending between said first and second lateral sides and extending along a length of said block, each one of said plurality of heating elements undulating laterally from one lateral side towards the other for increasing surface area, said plurality of heating elements being stacked to maximize heat transfer and minimize deformation of said elongated block during heating;
- an actuator for turning said heating elements on or off being operationally coupled to said heating elements, said actuator being positioned in said vehicle, said actuator being operationally coupled to a power supply;
- a thermostat being operationally coupled to said actuator and in communication with an outer environment of said vehicle, said thermostat being adapted for turning said heating elements off when an ambient temperature is greater than a selected temperature; and
- wherein said wiper blade is removably positionable in said channel.

6. A heated saddle system comprising:

- a wiper blade being elongated and having an upper rounded portion and a pointed lower portion taken transversely to a longitudinal axis of the blade;
- a wind shield wiper arm pivotally coupled to a vehicle:
- an elongated block having a first end and a second end, said block having a top side, a bottom side, a first lateral side and second lateral side, said bottom side having a channel therein extending toward said top side and extending through said first and second ends, said channel being rounded taken transversely to a longitudinal axis of the block, said elongated block comprising a rigid elastomeric material, said top side being attached to said wind shield wiper arm;
- a plurality of corrugated heating elements being positioned in said block, said heating elements extending between said first and second lateral sides and extending along a length of said block, each one of said plurality of heating elements undulating laterally from one lateral side towards the other for increasing surface area, said plurality of heating elements being stacked to maximize heat transfer and minimize deformation of said elongated block during heating;
- an actuator for turning said heating elements on or off being operationally coupled to said heating elements, said actuator being operationally coupled to a power supply; and
- wherein said wiper blade is removably positionable in said channel.

\* \* \* \* \*